May 2, 1944. J. E. BOWKER 2,348,053
ELECTRICALLY OPERATED MOTOR VEHICLES
Filed July 10, 1941 2 Sheets-Sheet 1

INVENTOR
John Earl Bowker
BY
ATTORNEYS

May 2, 1944.  J. E. BOWKER  2,348,053

ELECTRICALLY OPERATED MOTOR VEHICLES

Filed July 10, 1941  2 Sheets-Sheet 2

INVENTOR
John Earl Bowker
BY *Munn, Anderson & Liddy*

ATTORNEYS

Patented May 2, 1944

2,348,053

UNITED STATES PATENT OFFICE 2,348,053

ELECTRICALLY OPERATED MOTOR VEHICLE

John Earl Bowker, Tusmore, South Australia, Australia

Application July 10, 1941, Serial No. 401,793
In Australia July 26, 1940

3 Claims. (Cl. 171—313)

This invention relates to improvements in and to electrically-operated motor vehicles. There are in electrically-operated motor vehicles a number of features which it is necessary to study closely if such a vehicle is to be a success, the chief of which features is probably the conservation of energy by utilising as much power as possible which would normally be wasted in overcoming the resistance to propulsion of the vehicle.

The object of this invention therefore is to provide a battery-driven vehicle wherein a substantial reduction of losses is effected.

According to my invention each wheel which is to be driven is provided with an independent dynamotor which is, when the vehicle is being driven forward, supplied with the necessary driving current and which operates when the vehicle is running free to charge the batteries, to act as a brake, or to do other useful work.

A feature of the invention is the incorporation of a dynamotor within each wheel which is to be driven. A further feature is a particularly arranged electrical control arrangement whereby the regenerating effect is brought into circuit when the dynamotor is to act as a brake. Further features of the invention will be apparent from the following description which is to be made with reference to the accompanying drawings in which is shown an embodiment of the invention showing it applied to a battery-driven road car.

In the drawings

Figure 1:
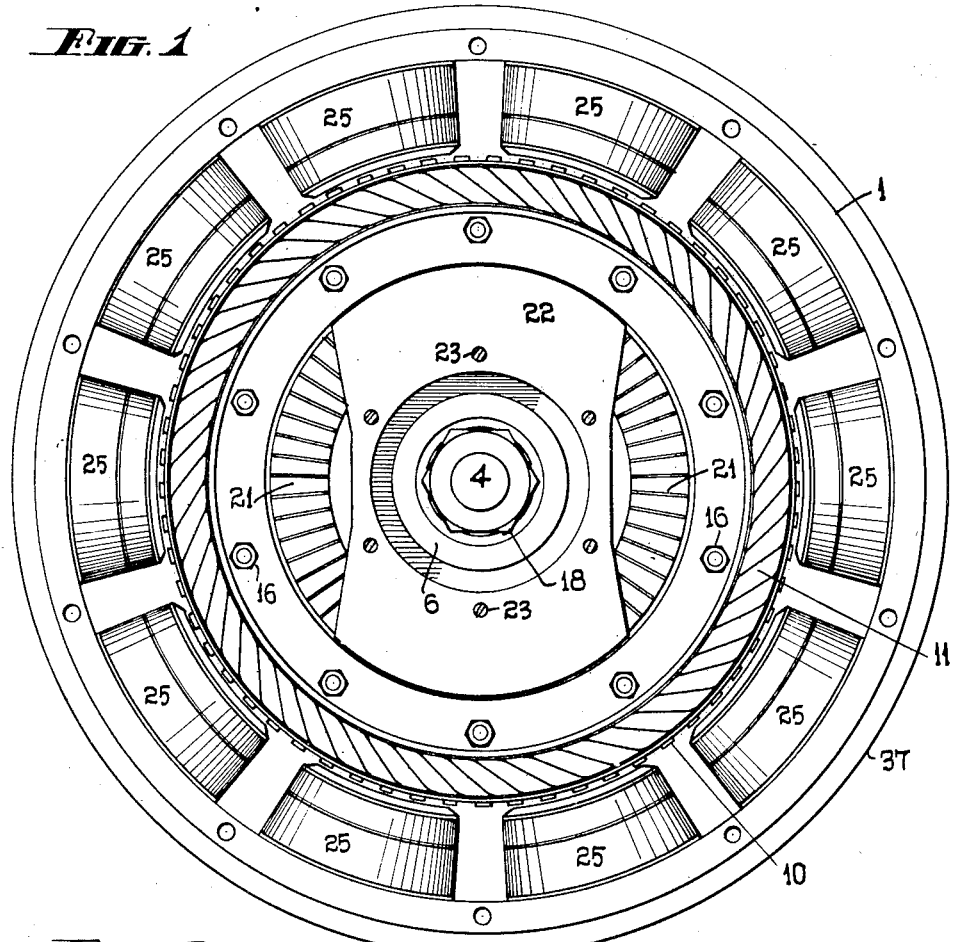
Fig. 1 is a view of the driving part of a wheel with the front cover and supporting plate and the tyre and tyre carrying rim removed but leaving the brush-carrying block which revolves with the cover plate in place.
Figure 2:
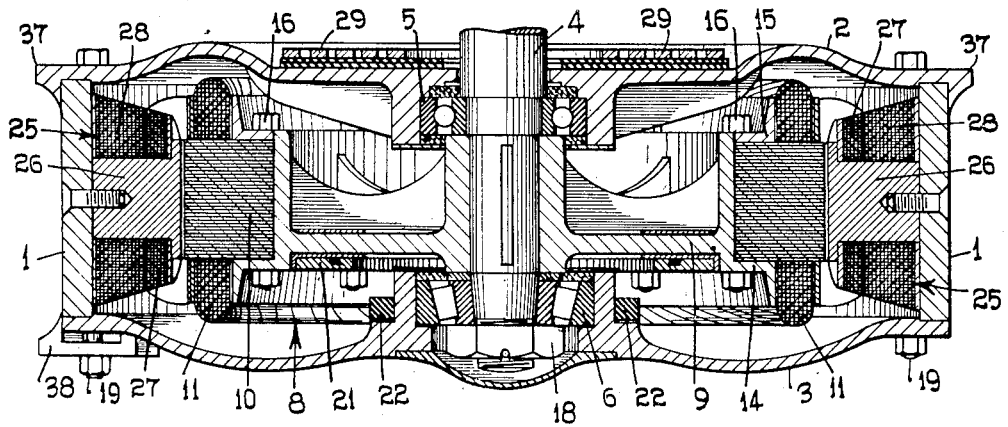
Fig. 2 is a central horizontal cross section of the driving part of the wheel.

The wheel as illustrated particularly in Figs. 1 and 2 comprises an outer revolvable rim or field yoke 1 over which the tyre-carrying rim of the wheel is adapted to be positioned. A rear plate 2 and a front plate 3 locate the rim 1 about a fixed axle 4, a bearing 5 being disposed between the plate 2 and the axle 4, and a bearing 6 being disposed between the front plate 3 and the axle 4.

Fixed upon the axle 4 so it cannot revolve thereon is an armature 8 comprising a support 9 which carries upon it laminations 10 which are slotted to take the armature windings 11. The laminations are clamped in place between a flange 14 upon the support 9 and a flange 15 held upon such support by means of the bolts 16.

The armature support 9 together with the inner bearings 5 and 6 are locked in place upon the axle 4 by means of a key and lock nut 18.

The plates 2 and 3 are locked securely to the field yoke 1 by means of bolts 19.

Carried upon the support 9 is a commutator 21 which is associated with the armature, this commutator taking any usual or approved form and being adapted to be engaged by brushes carried upon a plate 22 which is secured by means of bolts 23 to the front plate 3 of the wheel.

The field coils 25 of which there are ten each comprises a core 26 and two windings 27 and 28 respectively the windings 27 being a series field winding and the winding 28 being a regeneration winding.

Figure 3:
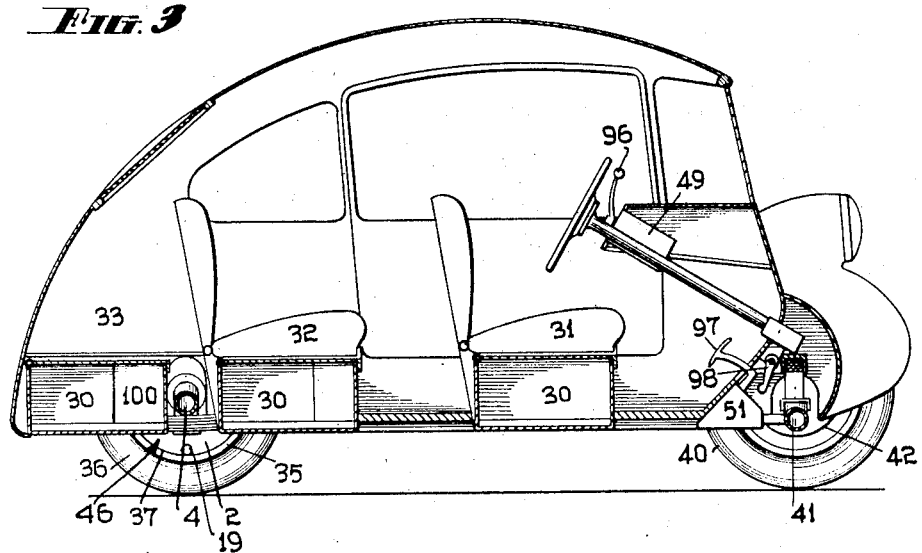
Fig. 3 is a somewhat schematic sectional view showing a vehicle incorporating the invention.
Figure 4:
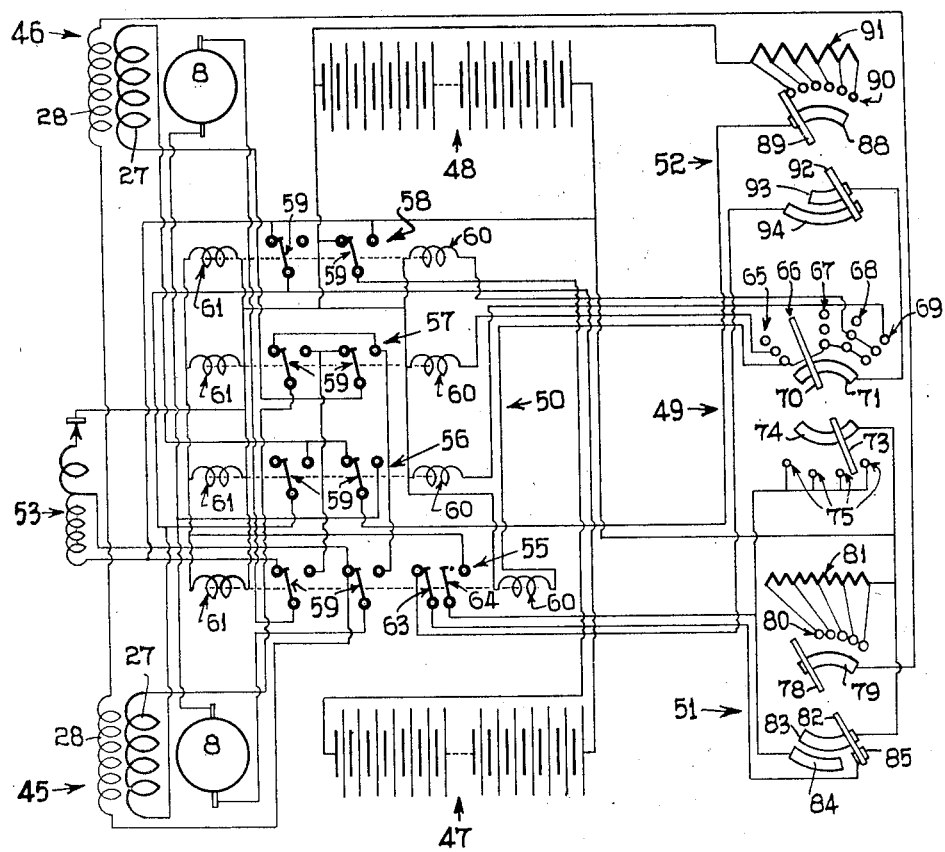
Fig. 4 is a circuit diagram of the vehicle illustrated in Fig. 3 showing electrical drive applied to the two rear wheels only.

A wheel constructed as described can operate as a self-contained unit, the armature 8 being non-rotational and the field yoke 1 revolving about same and providing the drive and when applied to a vehicle as shown in Fig. 3 such wheel is simply secured over the axle 4 and connected into an appropriate electrical circuit for instance that shown in Fig. 4 of the drawings. The current is taken to and from the wheel through slip rings 29.

In the vehicle shown in Fig. 3 the battery cradles are designated 30 these being disposed beneath the front seat 31, the back seat 32 and the luggage space 33.

The rim 35 upon which the tyre 36 of the wheel is secured is positioned over the field yoke 1 of the dynamotor and fits back against the flange 37 of the rear plate 2, the rim being locked in place by suitable clips such as that shown in Fig. 2 and designated 38.

The front wheels 40 are supported upon a suitable axle 41 and are provided with friction brakes 42.

Referring now to the circuit shown in Fig. 4. In this the one dynamotor is designated 45 and the other 46, each comprising an armature 8, series winding 27 and regeneration winding 28. The batteries which are arranged in two sets are designated respectively 47 and 48. A selector switch 49 controls a main switch gear 50 which effects the necessary changes in the circuits to provide for different running speeds and for the regenerative braking, while an electrical braking controller 51 controls the amount and time of regeneration, and a clutch control 52 permits the dynamotors to be started off slowly or otherwise run at intermediate speeds when such is required for short periods. 53 represents a cut-out which prevents the batteries from driving the dynamotors when insufficient regeneration voltage is available to cause charging of the batteries.

The switch gear 50 comprises four banks of solenoid-operated switch means 55, 56, 57, and 58, the movable arms 59 of all of these being linked in any usual manner to be operated by means of their respective solenoids 60 and 61, the solenoids 60 moving the arms 59 in one direction and the solenoids 61 moving them in the opposite direction, the switches being of the type which automatically retain the position into which they are moved by the solenoids without the necessity of maintaining a current flow through the winding 60 or 61. The switch bank 55 includes a double pole section 63—64 which serves to cut off the solenoids 60 or 61 immediately they have moved the switch banks to position.

The selector switch 49 has five positions designated 65, 66, 67, 68 and 69, these positions giving the following motor connections.

When the slider 70 is set to connect the circuit member 71 with the contacts at the position 65 the solenoids 60 of the switch banks 55 and 57 are momentarily energised to cause the arms of such banks to move over to the opposite position to that shown in Fig. 4 whereupon it will be seen that the two motors 45 and 46 have their field windings 27 in series with the armatures 8 while such motors are themselves in series and connected across the batteries 47 and 48 which are in parallel.

When the slider 70 is set to position 66 the switches are as shown in Fig. 4, this position corresponding to neutral in which no drive is being applied to the motors.

In passing from the position 65 to 66 the further slider 73 which moves in synchronism with the slider 70 has momentarily coupled the circuit member 74 to one of the contacts 75 this resulting in an impulse being transmitted through the member 64 of the switch bank 55 to all of the solenoids 61 pulling the switch arms 59, 63 and 64 over to their neutral position.

In the position designated 67 only the switch bank 55 is pulled over so that the circuit remains the same as that referred to in the first drive with the exception that the direction of the current through the armatures is reversed relatively to the series fields so that the means are driven forwardly. Owing to the two motors being in series and the batteries in parallel a low power drive only results which is suitable for starting or for slow running.

When the selector is set to the position indicated by 68 the switch bank 58 is pulled over as well as the switch bank 55, thus while maintaining the series connection of the two motors the battery connection has been changed from parallel to series, this applying a double voltage to the motors and resulting in greater power being developed by them.

In the final position, that indicated by 69, the switch bank 56 is also moved over, this changing the connection of the motors 45 and 46 to a parallel connection with the result that the motors in parallel are across the batteries which are in series, thereby developing the maximum power of the unit.

It will be appreciated that each time the slider 70 of the selector switch 49 is moved from one to another of its positions the synchronously moving slider 73 engages one of the contacts 75 and returns the arms of any of the displaced banks of switches 55, 56, 57 and 58 to their neutral position which is the position in which regeneration can take place.

For regeneration to take place the slider 78 of the switch 51 must be moved to couple the circuit member 79 to one of the series of contacts 80, this completing the circuit through the regeneration windings 28 of the two motors 45 and 46, the output being regulated by the position of the slider 78 relative to the resistance 81 which decreases in value as the slider 78 progresses along the contacts 80. In this way the amount of braking and consequently the amount of current returned to the batteries can be progressively controlled so that the effect of the braking is very similar to the usual mechanical braking.

When the switch is in the braking position the batteries are in parallel while the armatures 8 of the two motors 45 and 46 are themselves in series and across the batteries, the one winding of the cut-out 53 being across the armatures. The regeneration windings 28 of the two motors 45 and 46 themselves are in series and are connected across the batteries through the other winding of the cut-out 53, the cut-out being arranged to prevent discharging of the batteries through the motors when the output of the motors then acting as generators is too low to provide the correct potential difference between the motors and the batteries.

Moving synchronously with the slider 78 is a slider 82 which when regeneration is to take place, that is to say when the slider 78 is moved to engage one of the contacts 80, connects the circuit member 83 to the member 84 which is in parallel with the aforesaid contacts 75 so that if regeneration is desired at a time at which the selector switch 49 is in any of its driving positions the switch banks 55, 56, 57 and 58 are automatically returned to their neutral position by movement of the control 51. When the control 51 is in its inoperative position which is that shown in the drawings the slider 82 contacts with the segment 85 and completes the circuit to the switch arm 63.

The resistance control 52, which will be herein referred to as a clutch, and which comprises a circuit member 88, slider 89, contacts 90 and resistance 91 serves to increase the circuit resistance when the slider 89 is moved over from the position shown in Fig. 4 in which the resistance is bridged out. Movement of the slider in a clockwise direction includes more of the resistance 91 in the circuit.

The slider 92 which moves synchronously with the slider 89 normally bridges the two circuit members 93 and 94 but serves the purpose of allowing the selection of any position for the slider 70 of the selector switch 49 without energising the motors, this being effected by moving the clutch to its fully out position that is its clockwise rotation whereby the slider 92 ceases to bridge the circuit members 93 and 94 and cuts off the power from the circuit members 71 and consequently from the solenoids 60 of the control switch 50.

The selector switch 49 which may be of any usual construction is preferably mounted adjacent the steering column and is provided with a lever 96 whereby the positions may be selected. The regeneration control 51 is preferably operated by means of a brake pedal 97 which has the same location as the normal brake pedal in a vehicle. The pedal 97 can be associated with an arm 98 which operates the ordinary mechanical brake 42 of the wheels when the maximum or nearly the maximum electrical braking in is operation.

The clutch 52 is also operated by a foot pedal having a position corresponding to that of the normal clutch pedal in a vehicle.

The switch gear 50 is carried in the box 100. By the use of a plurality of dynamotors a number of advantages are achieved the first being that each wheel is provided with independent operation so that a differential effect may obtain between the wheels but with the advantage that when one wheel is retarded the other still maintains its drive, another advantage being the possibility of utilising the dynamotors as controlling means such as by connecting them in series or in parallel or by connecting the fields in series or in parallel, the arrangement thus making the control of the units very flexible and permitting a high efficiency to be obtained by eliminating normal controlling resistances or other similar means which are in some systems essential to enable effective power and speed control to be obtained.

The use of dynamotors in electrically-operated vehicles wherein the driving power is wholly or chiefly supplied by batteries is of the greatest importance and results in a substantial saving of electrical power and also a reduction of normal mechanical wear which would take place if the vehicle did not use dynamotors.

The saving in power is effected principally by the use of the dynamotors for regenerative braking purposes according to which the momentum of the vehicle is used on all possible occasions to feed back generated current to the batteries which normally drive the vehicle. It is found when operating a regenerative electric vehicle that a much increased performance can be obtained firstly in that greater range is possible owing to the recovery of power which would otherwise be dissipated, and secondly that higher speeds can be obtained because it is possible to draw more current for peak loading periods if such is required, the additional current draw being compensated by the recovered power during the regenerative operation.

The reduction of mechanical wear and inefficiency results chiefly by the elimination of the usual differential gear which it is necessary to use when driving two wheels of a vehicle from a single motor. The gear losses in a differential are considerable particularly once wear of the gear faces has taken place, and losses are also occasioned by the number of additional bearings and the length of the shafts which require to be driven. If the motor runs at a higher speed than the wheels, as is customary in the electrical practice used heretofore, regeneration would not take place at the same efficiency as happens when dynamotors directly coupled to wheels are used for the reason that gear losses when driving from a larger crown wheel to a gear pinion are much higher than when driving a smaller pinion by the motor.

The reduction of mechanical wear also results by the elimination of the ordinary friction braking means which it is necessary to utilise when no dynamotors are used. Friction braking is of course well known as a source of high loss in motor vehicles whereas regenerative braking which is itself of a more conveniently used nature has the effect of effecting a saving when in operation by feeding power back to the driving batteries of the vehicle.

The incorporation of the dynamotors in the wheel itself results in a low speed unit of high efficiency and low wear.

Instead of applying the invention to a motor vehicle of the type shown in the drawings its use may be extended to a vehicle in which more than two of the wheels are driven or in which only one of the wheels requires to be driven, for instance a cycle.

The dynamotor instead of being built directly into the wheel may be built as a separate unit and be coupled thereto by a shaft or other means with or without flexible couplings between the dynamotor and the wheel.

A factor which it is necessary to remember when considering battery-operated vehicles is that the total amount of power available from a battery of given capacity is higher as the current consumption is lowered so that any saving in propulsion power not only has the effect of reducing the amperage draw during the run of the vehicle but also renders the battery operation more efficient owing to such lower draw and consequently in this way further increasing the mileage which can be obtained on a battery charge.

What I claim is:

1. In electrically-operated motor vehicles improvements comprising; a plurality of wheels arranged to be driven, a dynamotor forming an integral part of each such wheel, batteries associated with the said dynamotors, switch banks connecting the dynamotors with the batteries, solenoids actuating the switch banks, a selector switch to energize the solenoids, switch members to disconnect the solenoids from the batteries immediately the switch banks have been moved to any position, a braking control to also energize the solenoids, electrical circuit connections between the switch banks and dynamotors and batteries to control the operation of the dynamotors as motors according to the position of the selector switch or as dynamos to charge the batteries according to the position of the brake control, and resistance means adjusted by the braking control to control the extent of the braking.

2. In electrically-operated motor vehicles improvements comprising; a plurality of dynamotors arranged one in each wheel which is to be driven, batteries associated with the said dynamotors, electrically-operated switch banks arranged to have a neutral position in which the dynamotors may act as dynamos each switch bank in its other position controlling the dynamotors as driving motors for the vehicle, selector means to actuate the switch banks to give different driving speeds of the dynamotors, a braking control associated with the switch banks to return all switch banks to their neutral position immediately the braking control is actuated and to complete the dynamo circuit to effect braking and charging of the batteries, and resistance means actuated by the braking control to increase the braking effect as the braking control is progressively moved from its off to its on position.

3. In electrically-operated motor vehicles improvements comprising; a plurality of dynamotors arranged one in each wheel which is to be driven, batteries associated with the said dynamotors, electrically-operated switch banks arranged to have a neutral position in which the dynamotors may act as dynamos each switch bank in its other position controlling the dynamotors as driving means for the vehicle by arranging the motors in series or in parallel and sections of the batteries in series or in parallel for controlling the driving speed of the dynamotors and reversing the drive, selector means to actuate the switch banks to give the different driving speeds, and a braking control associated with the switch banks to return all switch banks to their neutral position immediately the braking control is actuated and to complete the dynamo circuit to effect increased braking and charging of the batteries as the braking control is progressively moved.

JOHN EARL BOWKER.